United States Patent
Balakrishnan et al.

(10) Patent No.: US 8,707,278 B2
(45) Date of Patent: Apr. 22, 2014

(54) EMBEDDING CLASS HIERARCHY INTO OBJECT MODELS FOR MULTIPLE CLASS INHERITANCE

(75) Inventors: Gogul Balakrishnan, Princeton, NJ (US); Naoto Maeda, Lawrenceville, NJ (US); Franjo Ivancic, Princeton, NJ (US); Nishant Sinha, Plainsboro, NJ (US); Aarti Gupta, Princeton, NJ (US); Jing Yang, Charlottesville, VA (US)

(73) Assignee: NEC Laboratories America, Inc., Princeton, NJ (US)

( * ) Notice: Subject to any disclaimer, the term of this patent is extended or adjusted under 35 U.S.C. 154(b) by 382 days.

(21) Appl. No.: 13/251,463

(22) Filed: Oct. 3, 2011

(65) Prior Publication Data

US 2012/0117547 A1    May 10, 2012

Related U.S. Application Data

(60) Provisional application No. 61/411,611, filed on Nov. 9, 2010.

(51) Int. Cl.
   *G06F 9/45*    (2006.01)
(52) U.S. Cl.
   CPC .................... *G06F 8/4434* (2013.01)
   USPC .................... 717/136; 717/146; 717/151
(58) Field of Classification Search
   CPC ........................................ G06F 8/4434
   USPC ................... 717/136, 146, 140, 151
   See application file for complete search history.

(56) References Cited

U.S. PATENT DOCUMENTS

| | | | | |
|---|---|---|---|---|
| 5,983,020 A * | 11/1999 | Sweeney et al. | | 717/141 |
| 6,230,314 B1 * | 5/2001 | Sweeney et al. | | 717/108 |
| 6,675,377 B1 * | 1/2004 | Tanaka | | 717/152 |
| 7,500,229 B2 * | 3/2009 | Tanaka et al. | | 717/136 |
| 7,624,390 B2 * | 11/2009 | Asao | | 717/159 |
| 7,747,991 B2 * | 6/2010 | Tanaka | | 717/152 |

OTHER PUBLICATIONS

Hoist et al., "Inheritance Management and Method Dispatch", 1996.*
Aigner et al., "Eliminating Virtual Function Calls in C++ Programs", 1995.*
Gil, J., et al. "Space- and Time-Efficient Memory Layout for Multiple Inheritance", Proceedings of the 1999 ACM SIGPLAN Conference on Object-Oriented Programming Systems, Languages & Applications (OOPSLA '99). Nov. 1999. pp. 256-275.
Ramalingam, G., et al. "A Member Lookup Algorithm for C++", Proceedings of the ACM SIGPLAN '97 Conference on Programming Language Design and Implementation (PLDI '97). Jun. 1997. pp. 18-30.

(Continued)

*Primary Examiner* — Phillip H Nguyen
(74) *Attorney, Agent, or Firm* — Joseph Kolodka (57) ABSTRACT

A model is provided for transforming a program with a priori given class hierarchy that is induced by inheritance. An inheritance remover is configured to remove inheritance from a given program to produce an analysis-friendly program which does not include virtual-function pointer tables and runtime libraries associated with inheritance-related operations. The analysis-friendly program preserves the semantics of the given program with respect to a given class hierarchy. A clarifier is configured to identify implicit expressions and function calls and transform the given program into at least one intermediate program having explicit expressions and function calls.

19 Claims, 5 Drawing Sheets

(56) References Cited

OTHER PUBLICATIONS

Ramananandro, T., et al. "Formal Verification of Object Layout for C++ Multiple Inheritance", Proceedings of the 38th ACM SIGPLAN-SIGACT Symposium on Principles of Programming Languages, POPL 2011. Jan. 2011. (13 Pages).

Rossie Jr., J., et al. "An Algebraic Semantics of Subobjects", OOPSLA'95, Tenth Annual Conference on Object-Oriented Programming Systems, Languages, and Applications. Jan. 1996. pp. 187-199.

Wasserrab, D., et al. "An Operational Semantics and Type Safety Proof for Multiple Inheritance in C++", 21th Annual ACM Conference on Object-Oriented Programming, Systems, Languages, and Applications. Oct. 2006. pp. 1-16.

* cited by examiner

C++ Program

```
class T {int a;};
class L: public T;
class R: public T;
class B: public L, R;

T () {...}
L () {...}
R () {...}
B () {...} int main() {
    B* b = new B()
    L* l = new (L*)b;
    b ->L::a = 10;
    delete b;
    return 0;
}
```

EMBEDDING CLASS HIERARCHY INTO OBJECT MODELS FOR MULTIPLE CLASS INHERITANCE

RELATED APPLICATION INFORMATION

This application claims priority to provisional application Ser. No. 61/411,611 filed on Nov. 9, 2010, the entirety of which is herein incorporated by reference.

BACKGROUND

1. Technical Field

The present invention relates to techniques for program transformation, and more particularly, to program transformation techniques which facilitate program analysis.

2. Description of the Related Art

Modern object-oriented programming languages (e.g., C++) provide abstraction and data encapsulation features such as multiple class inheritance, dynamic virtual function dispatch, overloading, constructors and destructors, templates, functors, standard libraries, etc. Although these features may be helpful to a software developer during the creation of a program, these features complicate subsequent analysis of the program (e.g., program testing, program verification, bug testing, model checking, etc.).

When dealing with C++ programs, conventional analysis techniques have proved ineffective. These techniques typically perform analysis by translating the C++ program into C (often referred to as "lowering of a C++ program"), and performing analysis on the lowered program. However, traditional lowering techniques translate the program in a manner which is optimized for run-time performance and small memory footprint, as opposed to program analysis. Consequently, the translated program utilizes complex pointer arithmetic operations, virtual-base offsets, virtual function pointer tables, and run-time libraries. Unfortunately, program analysis and testing procedures do not perform well in the presence of these "analysis-hindering features."

One reason why the translated programs include the analysis-hindering features, such as virtual function pointer tables, is to account for the use of multiple class inheritance in the original program. "Multiple class inheritance" or "multiple inheritance" refers to a feature in a programming language which permits a class, or an object defined by a class, to inherit behaviors and features from more than one superclass or parent class. Other features of the original program that contribute to the use of these analysis-hindering features include complex expressions in the original program and implicit expressions in the original program (e.g., implicit calls to constructors and deconstructors, implicit overloaded operator calls, etc.).

SUMMARY

In accordance the present principles, a system is provided for transforming a program with a priori given class hierarchy that is induced by inheritance. An inheritance remover is configured to remove inheritance from a given program to produce an analysis-friendly program which does not include virtual-function pointer tables and runtime libraries associated with inheritance-related operations. The analysis-friendly program preserves the semantics of the given program with respect to a given class hierarchy.

In accordance with the present principles, a method is provided for transforming a program. A given program having inheritance is provided. Inheritance is removed from the given program to produce an analysis-friendly program which does not include virtual-function pointer tables and runtime libraries associated with inheritance-related operations. The analysis-friendly program preserves the semantics of the given program with respect to a given class hierarchy.

In accordance the present principles, another system is provided for transforming a program with a priori given class hierarchy that is induced by inheritance. An inheritance remover is configured to remove inheritance from a given program to produce an analysis-friendly program which does not include virtual-function pointer tables and runtime libraries associated with inheritance-related operations. The analysis-friendly program preserves the semantics of the given program with respect to a given class hierarchy. A clarifier is configured to identify implicit expressions and function calls in the given program and transform the given program into at least one intermediate program with explicit expressions and function calls.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, a model is provided for transforming object-oriented programs (e.g., C++ programs) in a manner which is amenable for program analysis. An object-oriented program may be written in a manner which utilizes multiple inheritance (shared or replicated), and may include complex expressions and implicit calls to certain features. Prior to program analysis, the program may be transformed into an equivalent program which is less complex and which does not include any inheritance. The transformed source code is generated in a manner which is optimized for program analysis. Program analysis can be performed on the original program by analyzing the transformed program which is translated in an analysis-friendly fashion.

Producing the analysis-friendly program may involve applying one or more semantic-preserving transformations to the original program. The transformations may produce a sequence of intermediate programs in intermediate languages. After the transformations are applied, the resulting program is semantically equivalent to the original program (for the a priori loaded class hierarchy), but is less complex and does not include inheritance. Consequently, the transformed program eliminates, or at least substantially reduces, the use of complex pointer arithmetic operations, virtual-base offsets, virtual function pointer tables, and run-time libraries. Eliminating these features from the translation facilitates program analysis.

The present principles may be applied to any program written in any object-oriented programming language. In accordance with one embodiment, the present principles may be applied to transform a C++ program. A C++ program can be converted into a semantically equivalent program which is less complex and which does not include inheritance.

A first series of transformations may be applied to reduce the complexity of the program. These transformations may include translating complex expressions into simple expressions or specifying implicit syntactic C++ features explicitly (e.g., converting implicit invocations of constructors and deconstructors to explicit invocations of constructors and deconstructors, or converting implicit overloaded operator calls to explicit overloaded operator calls). Applying these transformations may further include production of an intermediate program, or a series of intermediate programs, having reduced complexity and which includes a varying degree of C++ and C semantics.

The complexity reducing transformations may introduce the cilpp_cast and cilpp_store constructs. The cilpp_cast construct is used to mark the passing of a derived class pointer to a base class constructor. The cilpp_store construct is used to save the temporary object introduced during the simplification of the C/C++ ternary operator expression and assign the temporary object to the target of the ternary operator expression.

After the above transformations have been applied, inheritance may be removed from intermediate program. Removing inheritance may involve resolving casts, field accesses and function calls. The resulting program represents an analysis-friendly program which can be easily analyzed, and which does not utilize virtual table lookup pointers, runtime libraries, and other features which are not desirable for analysis. The resulting analysis-friendly program may represent a semantically equivalent program written in C or a semantically equivalent C++ program without any inheritance.

Inheritance can be removed from the program in a number of ways. In one embodiment, the Rossie-Friedman model of sub-objects is utilized in removing inheritance from a C++ program. Two particular implementations of this model are described below. The first model is referred to as CHROME (Class Hierarchy Representation Object Model Extension), and the second model is referred to as FORM (Flat Object Representation Model).

Other schemes may be employed to remove inheritance from a program. Regardless of the manner in which inheritance is removed from a program, the present principles can be employed to generate a transformed, inheritance-free program which can be easily analyzed due, at least in part, to the fact that virtual (function) pointer tables and runtime libraries are not avoided in the translation of the program. Modeling arbitrary class hierarchies in objects without these features permits less complex analysis methods to be utilized, lowers costs in developing program analysis modules, and provides for higher quality results of analysis outcomes.

The transformed program can easily be analyzed by any type of program analysis software. For example, in accordance with the present principles, a program may be transformed to facilitate program testing, program verification, bug finding, program re-engineering, model checking, bounded model checking, etc. The transformed program may be analyzed dynamically or statically.

It should be noted that while the present principles may be described herein using specific examples which transform a C++ program, it should be recognized that the present principles are applicable to all object-oriented programming languages including, but not limited to, Common Lisp, EuLisp, Curl, Dylan, Eiffel, Java, Logtalk, Object REXX, Scala, OCaml, Perl, Python, Tcl, etc.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
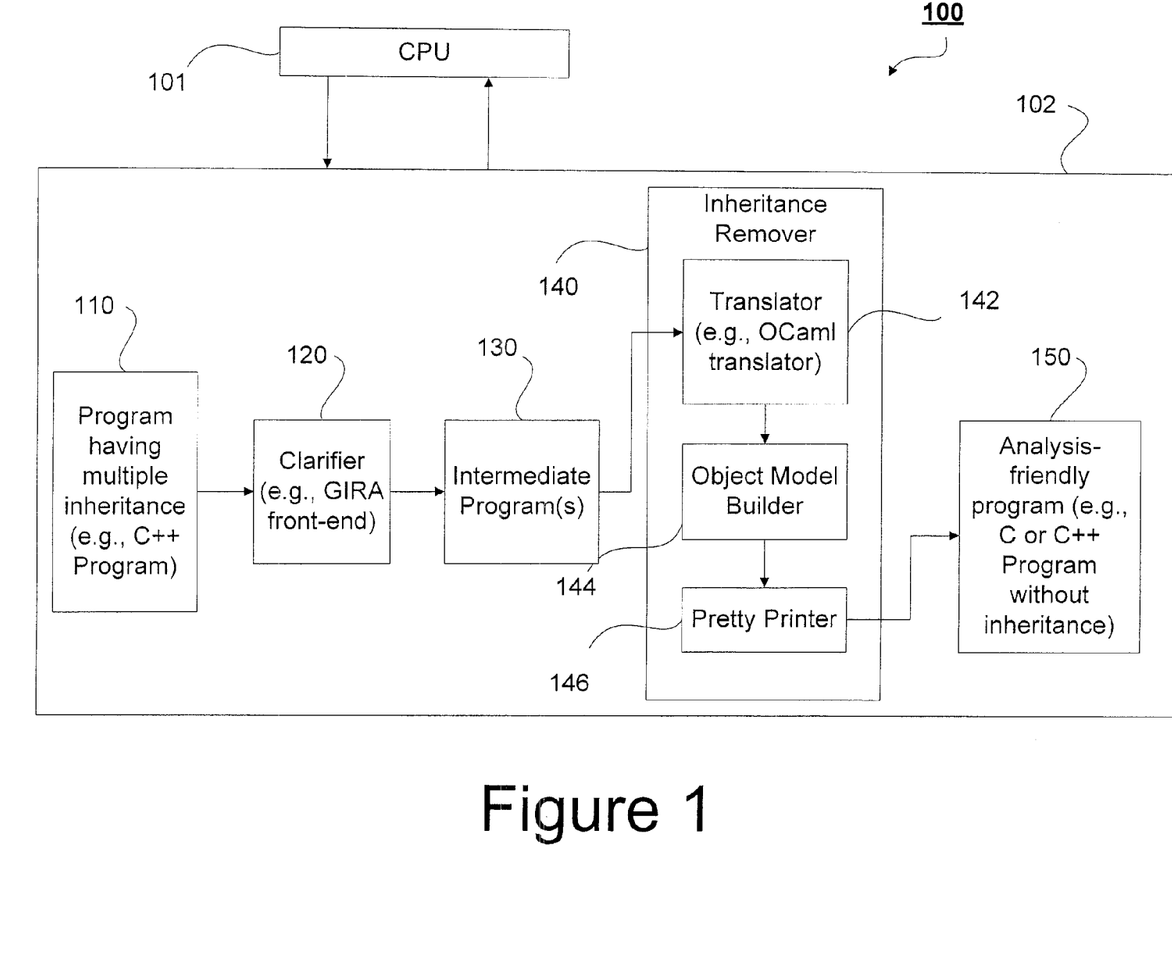
FIG. 1 is a block/flow diagram of a system for producing an analysis-friendly translation of a program in accordance with an embodiment of the present principles.

Referring now to the drawings in which like numerals represent the same or similar elements and initially to FIG. 1, a block/flow diagram illustrates a system 100 for transforming a program in accordance with one embodiment of the present principles. The system includes a central processing unit (CPU) 101 for executing instructions and a memory storage device 102 (e.g., RAM, ROM, etc.) for storing data. A program 110 is provided in an object-oriented language (e.g., C++). The program may include objects which are defined using multiple class inheritance (e.g., which include a class that inherits behaviors and features from more than one superclass or which defines an object using more than one superclass).

A clarifier 120 compiles the program 110 and transforms the program 110 into an intermediate program(s) 130 (also referred to herein as "CILPP") that is semantically equivalent to the original program 110 but which is less complex. In the case that the program 110 is written in C++, the clarifier 120 may include a GIRA (Generation of Intermediate Representation for Analysis) front-end 120. The GIRA front-end 120 is conceptually related to the well-known C Intermediate Language (CIL) front-end which is used to support program verification tools for the C language. However, unlike the CIL front-end, the GIRA front-end 120 includes extensions for C++ features and provides a set of tools which permit source-to-source translation of C and C++ programs. The GIRA front-end 120 can compile C and C++ programs into a few core constructs with a very clean semantics.

Processing a program 110 having classes defined using multiple inheritance with the clarifier 120 produces an intermediate program 130 which is less complex. The intermediate program 130 can include a mixture of C and C++ constructs (or a mixture of other programming languages). The clarifier 120 may simplify complex expressions in the original program 110 and convert implicit expressions to explicit expressions.

Converting implicit expressions to explicit expressions may involve converting implicit expressions associated with constructors, deconstructors, overloaded operators and casts to explicit expressions or declarations. For example, consider the statement "pb=new B( )" in C++ which invokes a constructor to create a new instance of object B. The clarifier 120 may translate the statement into a sequence of two statements which are inherently included in the constructor invocation: (1) "pb=allocnew B( )" which allocates memory on the heap (similar to the "malloc" statement in C/C++); and (2) "pb->B::B(pb)" which invokes the constructor for B.

Similar conversions may be applied to the invocation of deconstructors. For example, the statement "delete pb;" can be converted to the following two explicit statements in order to delete an object: (1) "pb->B::~B( )" which calls the deconstructor; and (2) "free_delete;" which frees the memory space associated with the deleted object (similar to the "free" statement in C/C++).

In implementing the above conversions, the clarifier 120 may introduce calls to the constructors of the immediate base classes (i.e., the parent class or superclass which is broader in the hierarchy of class definitions) in the constructors of derived classes (i.e., the child classes which inherit the attributes of the base class). Similarly, the deconstructors of bases classes may be added to the deconstructors of derived classes.

Other exemplary operations of the clarifier 120 may include making casts in the program explicit. For example, the statement "pl=pb" can be converted to "pl=(L*) pb" in order to specifically identify the object associated with the statement (note: the "L" identifying the particular object).

In the case that the original program 110 is written in C++, the output of the clarifier 120 is an intermediate representation (CILPP) 130 which may include a varying degree of C and C++ semantics. Hence, the CILPP representation 130 may include a mixture of C and C++ constructs. In one embodiment, the CILPP representation 130 may include inheritance-related C++ constructs, but may eliminate actual inheritance in the program by performing source-to-source transformations and modeling objects in a particular manner (e.g., using the CHROME or FORM objects model described herein).

It should be noted that the transformations applied by the clarifier 120 do not necessarily have to be applied together. Rather, the transformations can be applied separately and may result in a series of intermediate programs 130. For example, a first series of transformations can be applied to the original program 110 to produce an intermediate program 130 which converts expressions associated with constructors and deconstructors invocations. A second series of transformations may then be applied to convert overloaded operator calls, thus resulting in a second intermediate program 130. Even further, a third series of transformations may be applied to clarify casts. Hence, the generation of the intermediate program 130 can involve a plurality of transformations.

After production of the intermediate program 130, the inheritance remover 140 further transforms the intermediate program 130 by removing all inheritance from the program 130. In the exemplary embodiment disclosed in FIG. 1, the inheritance remover 140 includes three modules: a translator 142, an object model builder 144 and a pretty printer 146.

The translator 142 converts the intermediate program 130 into an Abstract Syntax Tree (AST) representation in a programming language. The translation preserves the semantics of the original program. In one embodiment, an intermediate program 130 is translated into an AST in OCaml (also known as Objective Caml) or lowered to C.

After translation of the program, the object model builder 144 further transforms the program by removing all inheritance (e.g., shared inheritance or replicated inheritance) from the classes in the program. This may involve converting the intermediate program 130 so that the classes or objects in the program are represented in a manner which does not include inheritance. In a preferred embodiment, the object model builder 144 may employ one of the CHROME or FORM object models described herein to remove inheritance from the program. Transforming the program in this manner helps to eliminate, or at least reduce, the use of low-level pointer manipulations and virtual function pointer lookups during program analysis.

In the CHROME object model, an object is viewed as a collection of its sub-objects. This model does not make assumptions about the physical layout of the fields in each object. Whenever an object is created, the sub-objects that belong to the class are created independently, and are linked to each other via additional pointer fields. The additional pointer fields which are used to link the objects are not to be confused with the virtual table lookup pointers that hinder program analysis. Rather, the additional pointer fields represent supplementary pointer fields which are stored as part of the object itself, and which are used to identify the sub-objects associated with objects. A more detailed description of the CHROME object model is described below with reference to FIGS. 3A and 3B.

Alternatively, the FORM object model may be applied to remove inheritance from a program. In the FORM object model, an object is extended (i.e., flattened) with all its sub-object fields and members. Hence, whenever an object is created, the sub-objects that belong to the class are grouped together into the object being created. Once again, no assumptions are made about the physical layout of the fields in each object. A more detailed description of the FORM object model is described below with reference to FIGS. 4A and 4B.

After removal of inheritance from the intermediate program 130, the program may be provided to a pretty printer 146. However, this is optional. The pretty printer 146 can render the source code in a manner which is easier for a programmer (or other person) to view, read and understand. For example, the pretty printer 146 can adjust the positioning, spacing, color, contrast, size or other formatting features of the source code. The source code rendered by pretty printer 146 may also be used to do further analysis. For example, the pretty printer 146 may be used to generate a C program, and the resulting C program may be analyzed by program analysis tools, such as abstract interpreters and model checkers, that work on C.

Application of the above transformations to a program 110 with multiple inheritance results in an analysis-friendly program 150 that is semantically equivalent to the original program 110, but which is analysis-friendly. Program analysis can be performed on the original program 110 by analyzing the semantically equivalent program 150 that does not include inheritance anymore.

The analysis-friendly program 150 may be provided in the original language that the program was written in, or in a different language. For example, in the case where the original program 110 is written in C++, the analysis-friendly program 150 may represent a transformed C++ program without inheritance. Alternatively, the program may be converted to a program written in C (often referred to as "lowering of a C++ program") that does not include inheritance.

Figure 2:
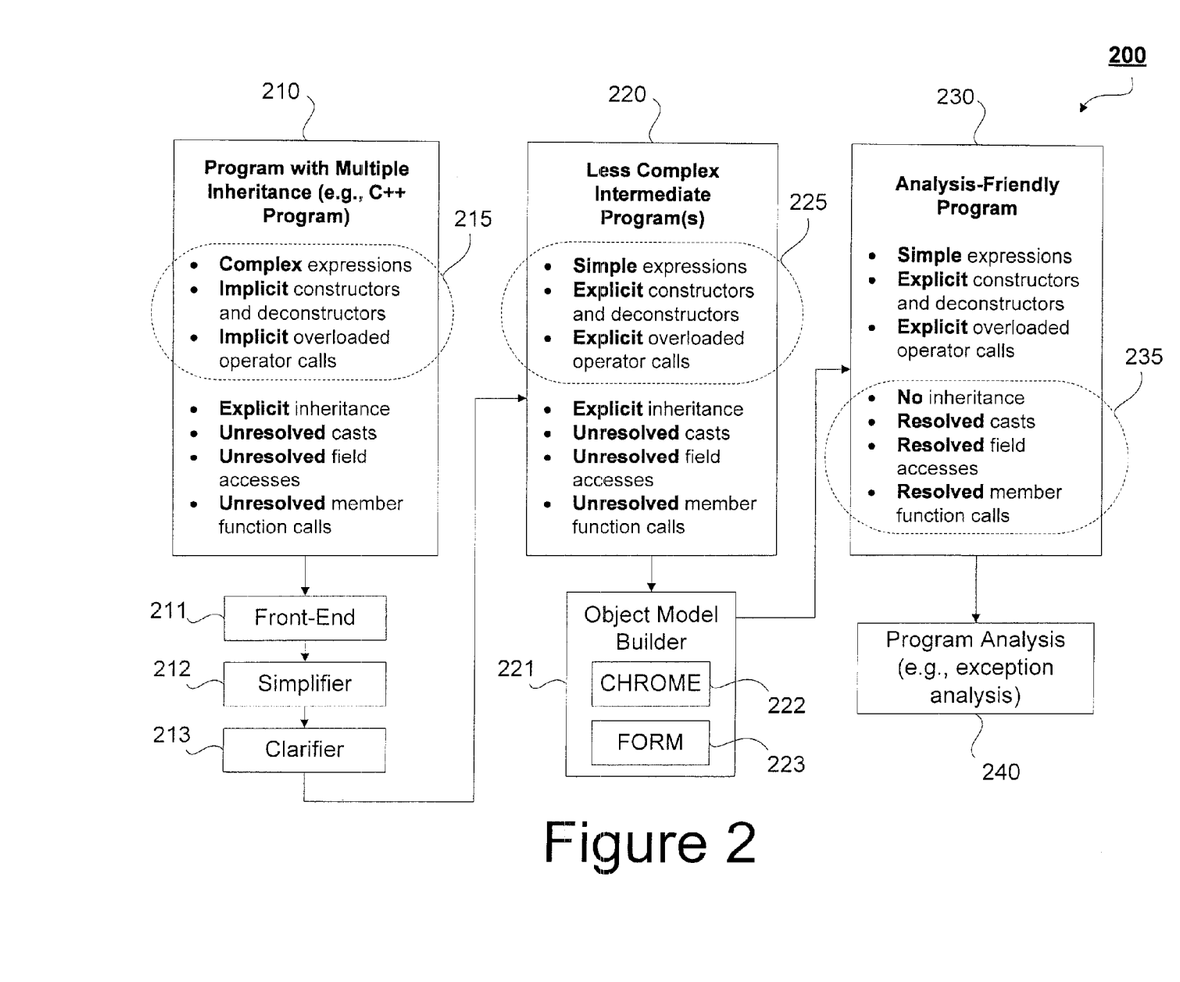
FIG. 2 is a block/flow diagram depicting various stages of a program as the program is being transformed in analysis-friendly fashion in accordance with an embodiment of the present principles.

FIG. 2 is a block/flow diagram 200 which illustrates the stages of a program that is being transformed to facilitate program analysis in accordance with an embodiment of the present principles. Program 210 represents an object-oriented program which includes multiple inheritance, and which is written using complex expressions and implicitly defined calls. Initial transformations may be applied to the program 210 by the front-end 211, simplifier 212 and clarifier 213.

The front-end 211 compiles the program 210 into a few core constructs with clean semantics, and provides for a source-to-source transformation of the original program 210. The simplifier 212 detects the presence of complex expressions in the program and converts the complex expressions to simple expressions. The clarifier 213 converts a number of implicit syntactic expressions to explicit expressions. For example, as explained above, this may include converting implicit expressions associated with constructors, deconstructors, overloaded operators and casts to explicit calls.

Although the front-end 211, simplifier 212 and clarifier 213 are described as separate modules or entities in the description of FIG. 2, it should be noted that the functions performed by these entities may be rolled into a single module (e.g., as described above with respect to the clarifier 120 in FIG. 1).

The above-described transformations result in the production of an intermediate program 220, or a series of intermediate programs 130. The dotted-lines labeled 215 and 225 indicate differences between the original program 210 and the intermediate program(s) 220.

The intermediate program 220 is forwarded to the object model builder 221 which removes inheritance from the intermediate program 220. The object model builder 221 may include a CHROME module 222 and/or a FORM module 223 which provide models for removing inheritance from the intermediate program 220. The object model builder 221 may further be configured to resolve casts, field accesses and member function calls. The output of the object model builder 221 is an analysis-friendly program 230 which does not include inheritance. The dotted-line 235 indicates some of the differences between the intermediate program(s) 220 and the analysis-friendly program 230.

Having converted the original program 210 to an analysis-friendly program 230 which does not include inheritance, program analysis operations 240 can be performed on the original program 210 by analyzing the semantically-equivalent analysis-friendly program 230. Program analysis operations can be dynamic or static operations and may include exception testing, program verification, model checking, etc.

FIGS. 3A, 3B, 4A and 4B demonstrate how the CHROME and FORM object models can be utilized to model the objects set forth in a program in a manner which does not include inheritance. Both of these models are derived from, and represent separate applications of, the Rossie-Friedman sub-object model. Therefore, before addressing the specifics of the CHROME and FORM object models, a description of the Rossie-Friedman sub-object model is provided along with an explanation of certain terms and phrases which are used throughout this description.

As used herein, "direct inheritance" refers to the situation where a child class inherits from an immediate parent class. For example, the child class may include an explicit statement or declaration which identifies a parent class and causes the child class to inherit the features of a parent class. "Transitive inheritance" refers to the situation where a child class inherits from a superclass indirectly through another class. For example, a child class X inherits from a parent class Y, which in turn inherits from another class Z. Using this example, child class X would directly inherit from class Y and transitively inherit from class Z.

A sub-object model may be employed which utilizes an abstract representation of an object's layout. When a class inherits (either directly or transitively) from another class, conceptually the base class (i.e., the parent class) is embedded into the derived class (i.e., the child class). Therefore, an object of a derived class includes different (possibly overlapping) components that correspond to the direct and transitive base classes of the derived class.

As used herein, a "sub-object" refers to a component of a direct or transitive base class that is embedded into a derived class object. The derived class object itself is also considered to be a "sub-object." For example, consider a class L that inherits from another class T. An object of type L includes two sub-objects: (1) a sub-object of type T corresponding to the base class T, and (2) a sub-object of type L that corresponds to the complete object itself. For every sub-object of a class, a unique ID (referred to as "soid") can be assigned.

As explained above, C++ supports multiple inheritance through which a class may inherit via more than one base class. In the case of single inheritance, there is only one copy of every base class in a derived class object. However, in the presence of multiple inheritance, a plurality of sub-objects corresponding to a single direct or transitive base class may be included in a derived class object. The situation becomes more complicated when a derived class includes multiple sub-objects of a single base class. Consider the scenario in Example 1 which will be referenced throughout the description herein.

EXAMPLE 1

An object B inherits from objects L and R. Thus, the B-object can be modeled as including sub-objects of type L and R. Further assume that the sub-objects of type L and R each separately inherit from a distinct sub-object of type T. Hence, a B-object transitively inherits twice from class T and has two distinct sub-objects of type T (i.e., one inherited from class L and the other inherited from class R).

C++ provides two mechanisms for representing inheritance, "replicated inheritance" or "shared inheritance". With replicated inheritance, separate copies of each sub-object are created. Hence, in Example 1, two separate sub-objects of T would be created.

Alternatively, C++ also provides for "shared inheritance". Shared inheritance is implemented with "virtual base classes" to prevent replication of base classes. Unlike a non-virtual base class, an object of a virtual base class type is shared among the objects of all its direct and transitive derived classes. Applying this to the above example, the B-object would include sub-objects of type L and R as usual. However, because the T-object is a virtual base class, a single T-object would be created which would be shared among the direct and transitive derived classes L, R, and B.

Thus, when a class inherits from a non-virtual base class, it is referred to as "replicated inheritance", or alternatively, when a class inherits from a virtual base class, it is referred to as "shared inheritance."

The present principles propose two different frameworks (i.e., CHROME and FORM) for modeling a program with multiple inheritance (shared and/or replicated) and transforming the program in a manner which removes all inheritance.

Figure 3A:
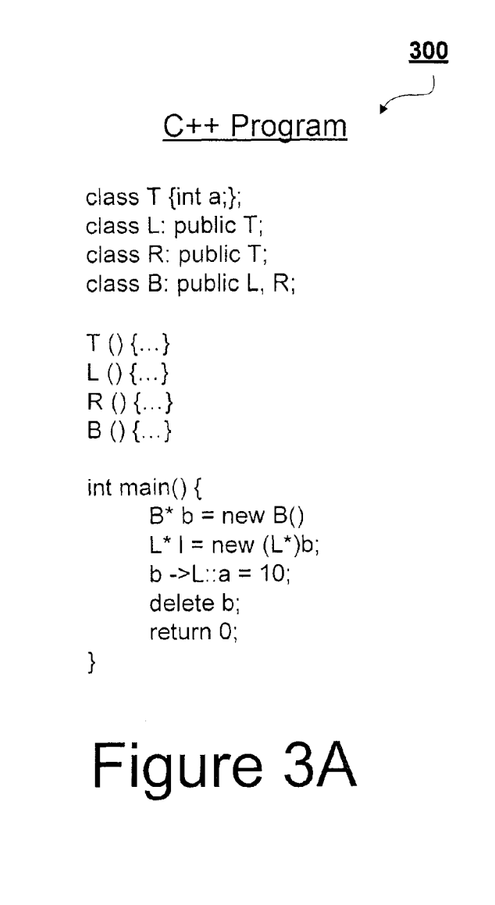
FIG. 3A is an exemplary C++ program used to illustrate an application of the CHROME object model in FIG. 3B.
Figure 3B:
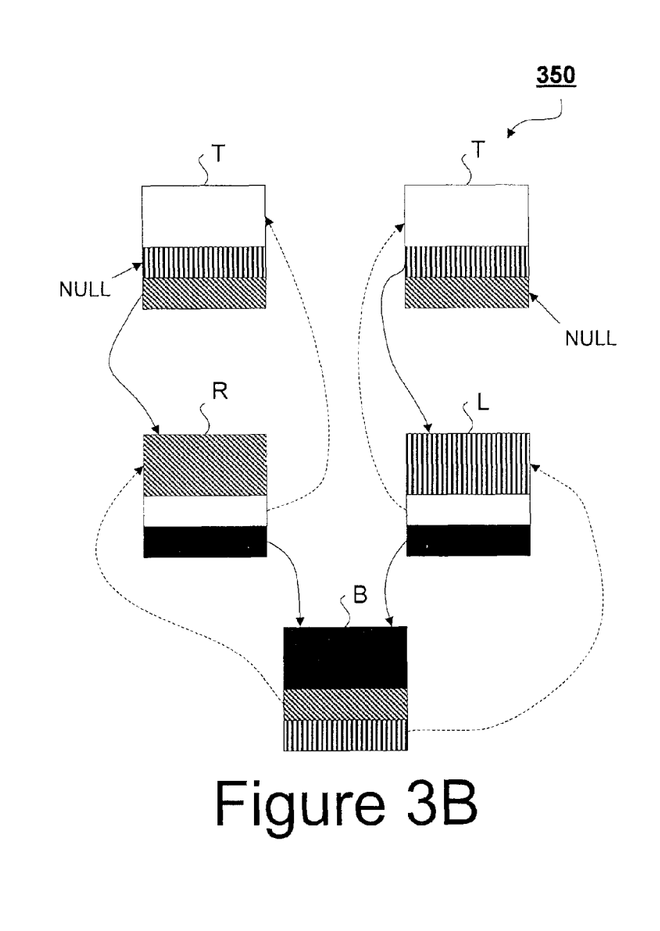
FIG. 3B is a diagram illustrating how the B-object in the program of FIG. 3A can be modeled using the CHROME object model in accordance with an embodiment of the present principles.

FIGS. 3A and 3B illustrate an exemplary application of the CHROME object model. FIG. 3A is a simplified C++ program 300 that defines a B-object with multiple inheritance. FIG. 3B illustrates how the CHROME object model can be used to represent the B-object in the program of FIG. 3A.

The exemplary program 300 in FIG. 3A includes the same hierarchy of classes as in Example 1 above. Specifically, the program creates an object B which inherits from objects L and R. Furthermore, the objects L and R each inherit from object T. Hence, the B-object inherits twice from object T: once from class L and once from class R.

The diagram 350 in FIG. 3B illustrates how the CHROME object model can be applied to model the B-object in the program 300 of FIG. 3A in a manner which does not include inheritance. The arrows indicate the relationships between the different objects. Specifically, the dotted arrows represent pointers which identify a base class of an object or sub-object, while the solid arrows represent pointers which identify a derived or child object of an object or sub-object.

Four different patterns are used to represent the four objects in the diagram 350. Specifically, a solid black pattern is used to identify the B-object, a solid white pattern is used to identify the T-objects, a vertical striped pattern is used to identify the L-object and a diagonal striped pattern is used to identify the R-object.

The relationship among the objects is defined using additional pointer fields that are appended to the objects. The additional pointer fields, which have been added to objects in accordance with the CHROME object model, include the pattern of the object which they identify. For example, two pointer fields have been added to the B-object (i.e., a pointer to the R and L objects). Each of these two pointer fields have been shaded with the pattern of the object that they identify.

Each sub-object from which the B-object inherits (directly or transitively) is created independently. Note that there are two T-objects created since the B-object inherits twice from the T class.

Derived objects modeled with CHROME only include pointers to base objects from which the derived objects "directly" inherit. Hence, the B-object only includes pointers to the L and R objects. Although the B-object inherits "transitively" from the T-object (via both the L object and R object), the B-object does not include a pointer to either instance of the T-object. Rather, only the L object and the R objects include pointers to the separate T-objects since the L and R objects directly inherit from the T-objects.

In addition, each sub-object includes a pointer to the derived or child object which inherits the traits of the sub-object (represented by the solid arrows). For example, the L and R objects each include a pointer field which identifies the B-object, and each instance of the T-object includes a pointer field which identifies one of the L or R objects.

Note that each of the T-objects includes a pointer field which includes a NULL value. This is because both the L and R objects inherit from the T-object. However, since only one of pointers is valid for each instance of the T-object, the non-valid pointer is set to NULL.

Implementing the above CHROME model to remove inheritance from a program involves a number of source-to-source transformations to convert a program to an analysis-friendly program 150. A detailed explanation of these source-to-source transformations is discussed below in the context of an exemplary C++ program. While the source-to-source transformations are discussed in the context of a C++ program, it would be apparent to of ordinary skill in the art that the same or similar transformations can be adapted to and applied to other object-oriented languages as well.

Let "Var" represent the set of valid C++ identifiers, "Type" represent the set of valid C++ classes, and "Mbr" represent the set of valid C++ member names (fields or functions). In describing the CHROME-related transformations, the framework may be restricted to the following constructs:

(1) A heap allocation statement (e.g., Var=allocnew Type( ) that allocates memory for all the sub-objects of a Type-object on the heap. Unlike the C++ new operator, allocnew does not invoke the constructor of the class Type. After the execution of allocnew, Var is assigned the address of the newly allocated space if successful. Otherwise, Var is set to NULL.

(2) A cast statement (e.g, Var=(Type*)Var) converts a pointer variable of one type to a pointer variable of another type. It is assumed that all casts correspond to dynamic_cast in C++. (The main difference between a dynamic cast and a static cast is that a dynamic cast performs a runtime check to ensure safety of the cast operation, while a static cast does not. Therefore, the source transformations performed at a dynamic_cast can be easily adapted to a static_cast.)

(3) A member access (e.g., Var->Type::Mbr) construct accesses the data member Mbr of class Type in the object pointed to by Var.

(4) A member function call (e.g., Var->Type::Mbr(Var list)) invokes a method Mbr of type Type on the object pointed to by Var.

(5) A deallocation statement (e.g., free delete(Var)) releases the memory that was allocated for all the sub-objects of the object pointed to by Var.

To remove inheritance from a given program, the CHROME object model may adjust the class declarations for each class and process the above-identified constructs in the program. Each of these transformations is discussed below Class Declarations: To facilitate construction of the CHROME model, additional members or identifiers may be added to each class. Specifically, each class can be appended to include the following:

(1) Sub-object ID (soid) field: To identify the sub-object that a class represents, a new field soid is added to the class if it uses inheritance. If a class C represents a sub-object 6, then the sub-object ID field is set to soid(δ) when δ is constructed.

(2) Base pointers: In every class C, for every immediate base class of C and every shared base class that is inherited by C, a pointer field of the parent class type is added. These pointers provide a way to access the fields of the base classes.

(3) Derived pointers: In every class C, for each immediate derived class and every class for which C is a shared base class, a pointer field of the derived class type is added. The pointers provide a way to access the fields of the derived classes.

In addition to the above transformations, the inheritance specifications in the class declarations are removed so that the classes can be used to represent the sub-objects of a derived class. Specifically, a sub-object with an effective type C is instantiated using the new class declaration for C.

Heap Allocation Statements: To process heap allocation statements in the CHROME model, a procedure or function may be employed to appropriately allocate sub-objects, sub-object IDs, and base pointer fields of a given class. Upon allocating the sub-objects for the given class C, the sub-objects of the members of class C are allocated. In contrast to the object layout used by a conventional compiler, the sub-objects are separated from the derived class object in the CHROME model. Therefore, the sub-objects of the member fields have to be created separately.

Furthermore, all of the constructors associated with an object are modified to set the derived pointer fields of the immediate base classes and the shared base classes to the newly constructed sub-objects. The base pointer fields are set in the proper order to prevent invalid base pointer field accesses when the pointers are initialized. In addition, the constructors are modified to update the derived pointer fields.

As the number of sub-object types grows exponentially, the actual number of sub-objects instances only grows linearly. Therefore, the increase in the number of sub-objects does not affect the scalability of the analysis.

Cast Statements: Consider a cast statement "tgt=(T*)src" in the CHROME model. Let S be the type of the class to which src points to, and T be the type of the class to which tgt points to. Let D be the least derived class that is common to both S and T.

The basic idea behind processing cast statements is to find all paths between classes S and T and convert each such path into a pointer access chain including the derived and base pointer fields. As a first step, a check may be performed to determine if the cast is ambiguous. If there does not exist a unique sub-object, this means that two sub-objects exist that have the same effective type. In this case, the cast is ambiguous and the analysis aborts. However, this is acceptable because a conventional compiler would also abort in this situation.

If the cast is not ambiguous, the process computes a set consisting of the possible sub-objects that the source pointer src may point to at runtime. For every sub-object in the set, the access path is computed starting from src consisting of a sequence of derived and base pointer fields to reach the required sub-object. If necessary, a function may be employed to determine the access path.

Field Accesses and Field Updates: Let "tgt=src->S::m" be the given member access statement. The statement is transformed in CHROME to the following statement: "tgt=((S*)src)->S::m". The idea is to treat a field access as being equivalent to the code sequence consisting of a cast of src to (S*) followed by the field access. Basically, the access path is generated from src and then the member is accessed.

Member Function Calls: Let "p->C::foo(p, . . . )" be the given member function call. If foo is not a virtual member function call, then an access path for p is built and the member function is accessed using the access path. In addition, the this argument of the function call is also replaced with the new access path.

If "C::foo" is a virtual member function, then the appropriate foo in the base or derived classes of C is invoked depending upon the sub-object held by the pointer p at runtime. A helper function can be employed in the model which returns the member functions that will be invoked at runtime depending upon the class type of the pointer and sub-object pointed to by the pointer.

For a virtual function call, all possible sub-objects that p could be pointing to at runtime are determined and the member function call is replaced with a "switch" statement that has a case for each sub-object in C. For each such case, the actual member function that would be invoked is determined and the access path is generated as in the non-virtual member function case.

Deallocation: The CHROME lowering procedure generates a free_delete function for every class type included in the complete set of class names. The free_delete function for a class C takes an argument c of type C*, and deallocates all the sub-objects associated with the object pointed to by c.

As a first step, the function determines the actual class of the sub-object pointed to by c. This determination is made because a derived class object may be deallocated using a pointer to a base class sub-object. This step is analogous to how a compiler handles virtual destructors.

After the actual class D is determined, the memory associated with sub-objects of class D are identified and deallocated. After deallocating the sub-objects, the free_delete function deallocates the sub-objects associated with the data members of class D. This is performed because the sub-objects are created independently, even for member fields.

Special Handling: Nearly all constructs in the C++ 0x standard can be adapted in accordance with the above description, except for the following cases that require special attention:

(1) Invocation of constructors for virtual base classes: Recall that the clarifier introduces calls to the constructors of immediate base classes in the constructors of derived classes. When a class is inherited using shared multiple inheritance, there is only one copy of the shared base class. Thus, only one object has to be initialized. However, because the constructor is called from all the immediate derived classes, the constructor of a virtual base class would be invoked multiple times.

To avoid multiple invocations of the constructor of a virtual base class, the CHROME transformations introduce an additional data member initCnt into every virtual base class, which is initialized to zero before the calls to constructors. In addition to the initCnt field, the following statement is added to the beginning of the constructors of every virtual base class: "if (initCnt++) return;".

Therefore, the actual body of the constructor of a virtual base class is only invoked once and it is always invoked from the constructor of the most derived object. A similar technique is used for the destructors.

(2) Virtual-function calls on partially constructed objects: For virtual function calls on partially constructed objects, the CHROME lowering method may be implemented with C++ semantics. In a C++ constructor or destructor, the partially constructed object is treated as though it is an object of the type to which the constructor or destructor belongs. Our lowering method follows the same semantics.

(3) Object assignment: A C++ statement that byte copies all the data member fields of an object csrc of class type C to another object ctgt of the same type C is as follows: "ctgt=csrc;".

However, in the CHROME model, the sub-objects are separated from the derived class object. Therefore, the CHROME lowering procedure generates additional assignments that copy the sub-objects associated with csrc into the sub-objects associated with ctgt.

(4) Exceptions: Exceptions are an important error handling aspect of many object-oriented programming languages such as C++ and Java. Exceptions are often used to indicate unusual error conditions during the execution of an application (e.g., resource exhaustion) and provide a way to transfer control to a special purpose exception handling code. The inclusion of exceptions into a program introduces additional, and often complex, control flow into the program, in addition to the standard non-exceptional control flow.

In accordance with the present principles exception control flow in the program is made explicit for sound static analysis. A procedure may be provided for transforming a C++ program with exceptions into a semantically equivalent C++ program without exceptions. These "exception-elimination transformations" can be performed in conjunction with the inheritance-elimination transformations.

(5) Templates: Template classes and template functions are instantiated. Instantiated template classes and template functions can be treated as regular classes and functions, respectively.

Figure 4A:
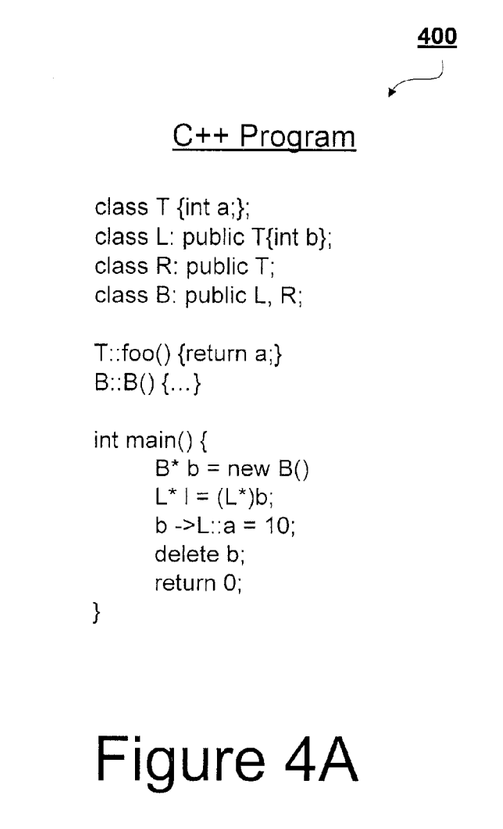
FIG. 4A is an exemplary C++ program used to illustrate an application of the FORM object model in FIG. 4B.
Figure 4B:
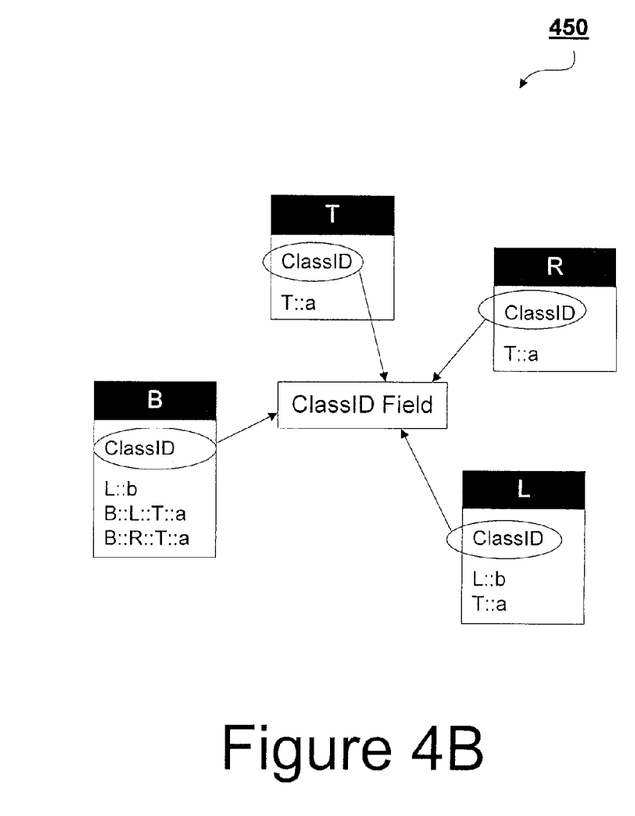
FIG. 4B is a diagram illustrating how the FORM object model can be applied to model objects in the program of FIG. 4A in accordance with an embodiment of the present principles.

Moving on to FIGS. 4A and 4B, an exemplary application of the FORM object model is disclosed. FIG. 4A depicts a simplified C++ program with multiple inheritance. FIG. 4B depicts the manner in which the FORM object model can be used to represent the objects in the program of FIG. 4A.

The exemplary program 400 in FIG. 4A is different from the program 300 in FIG. 3A, but the program 400 includes the same hierarchy of classes. That is, the program 400 includes an object B that inherits from objects L and R, which each inherit from object T. Thus, the B-object transitively inherits twice from object T.

The diagram 450 in FIG. 4B illustrates how the objects in program 400 can be modeled in accordance with the FORM object model. This model does not make assumptions about the physical layout of the fields in each object. Whenever an object is created, the sub-objects that belong to the class are grouped together into the object being created. That is, an object being created is extended (i.e., flattened) to include all of the fields and members set forth in the sub-objects associated with the object. The fields and members are included in the object regardless of whether the object inherits from the sub-objects directly or transitively. For example, note that the L and R objects include the field "T::a" from the T-object. Similarly, the B-object includes all of the fields and members included in each of the L, R and T objects.

If a field is transitively included in an object, the object will also store a path of sub-objects which indicate the origin of the field. For example, notice that the B-object transitively inherits twice from the T-object, since the B-object inherits from the T-object via both the R-object and the L-object. Thus, the B-object includes two copies of the field "T::a" from the T-object, and these are stored in the B-object along with the paths which indicate the sub-object from which the field originated (i.e., "B::L::T::a" and "B::R::T::a").

Using the above-described FORM framework, a program defining objects using multiple inheritance features can be transformed into a semantically-equivalent representation which does not include any inheritance. The program including these transformed objects can then be easily analyzed without the use of pointer arithmetic, virtual table lookup pointers and runtime libraries.

Implementing the above FORM model to remove inheritance from a program involves a number of source-to-source transformations to convert a program to an analysis-friendly program 150. A detailed explanation of these source-to-source transformations is discussed below in the context of an exemplary C++ program. While the source-to-source transformations are discussed in the context of a C++ program, it would be apparent to of ordinary skill in the art that the same or similar transformations can be adapted to and applied to other object-oriented languages as well.

To remove inheritance from a given program, the FORM object model may adjust the class declarations for each class and process the constructs discussed above (e.g., heap allocation statement, cast statement, member access construct, etc.).

Class declarations: When there is multiple inheritance, a class may have multiple copies of the fields of some base class. The FORM model creates multiple copies of such fields in every class and renames them to avoid ambiguity. In addition, for every field in the class, it maintains a list of its copies in a separate table.

The class hierarchy is modified so that every class has only one base class. For example, if a class D inherits from multiple classes (say B1, . . . Bn), one of the classes (say B1) is considered a base class of D. One of the remaining classes (say B2) is considered the base class of B1, and so on. Every class is extended with the fields of the immediate and transitive base classes as per the modified hierarchy.

For all pointer types of a class C that are involved in inheritance, a new type CFatPtr is defined, which is essentially a fat pointer that holds a pointer to C and the sub-object ID. Every pointer variable C*cptr in the code is changed CFatPtr cptr. Similarly, multiple pointers like C**ptrptr get changed to CFatPtr*cptrptr, and so on. The soid field of the fat pointer keeps track of the sub-object of the original object instance to which ptr is referring to. When a fat pointer is declared, it is assumed that the value of soid is 1 and that the value of ptr is NULL.

Heap allocation statements: At each heap allocation, the fields of the fat pointer are updated accordingly: (1) the soid field is set to the appropriate value, and (2) the pointer field is set to the newly allocated memory.

Cast Statements: For a cast "tgt=(T*) src", the soid of the objects that "src" may point to at runtime are determined. A switch statement is generated with a case for every such soid, where the soid field of "tgt" is set to the soid of the corresponding corresponding sub-object of type T.

Member Access: For a field access "src->m", the soid of the sub-objects that "src" may point to at runtime is determined, and a switch statement is generated with a case for every such soid, where the appropriate copy of the field corresponding to the soid is accessed.

Member Function Calls and Virtual-function calls are handled similar to CHROME except that the procedure relies on the soid field of fat pointer.

Figure 5:
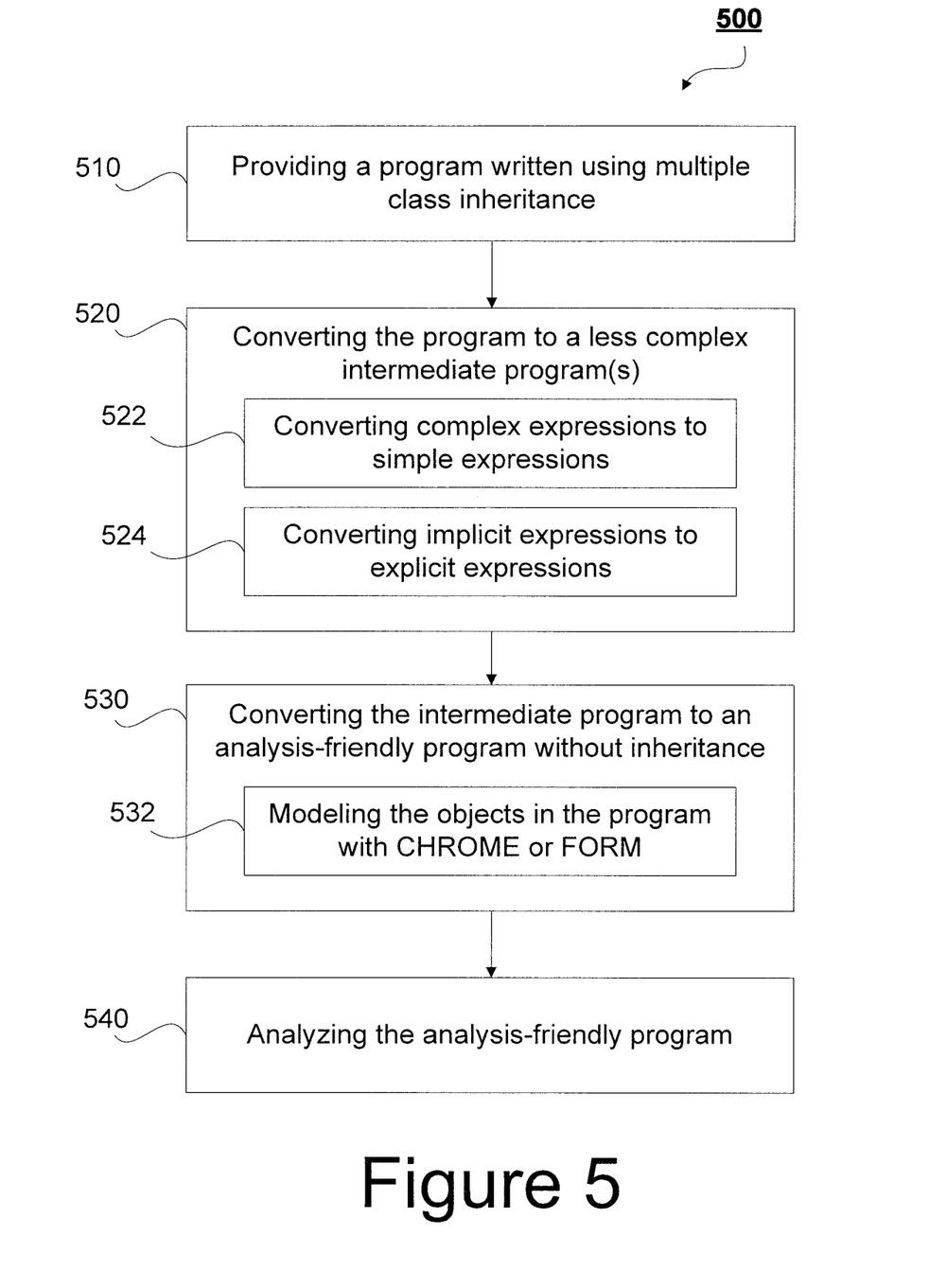
FIG. 5 is a block/flow diagram illustrating a method for transforming a program in accordance with an embodiment of the present principles.

FIG. 5 is a block/flow diagram illustrating a method 500 for transforming a program in accordance with an embodiment of the present principles. In block 510, a program 110 is provided having a class hierarchy with multiple class inheritance features of a programming language. The program 110 may be written in any object-oriented language (e.g., C++).

The program 110 is converted to a less complex intermediate program 130, or series of intermediate programs (block 520). Generating the intermediate program 130 may involve transforming complex expressions in the original program 110 into simple expressions in the intermediate program (block 522). For example, a complex arithmetic expression may be converted into several simplified arithmetic expressions.

Generating the intermediate program 130 may further involve converting implicit expressions in the original program 110 to explicit expressions (block 524). For example, as explained above, this may include converting implicit invocations of constructors and deconstructors to explicit invocations of the same, or converting implicit overloaded operator calls to explicit overloaded operator calls. Additional transformations may be applied in this step as well.

Next, in block 530, the intermediate program is converted to an analysis-friendly program 150 which does not include inheritance. This may include resolving casts, field accesses or member function calls. In preferred embodiments, the removal of inheritance from the program is accomplished in accordance with one of the CHROME or FORM object models described above (block 532).

The transformations applied to the program in blocks 520 and 530 are geared towards transforming a program into an analysis-friendly program 150 that avoids the use of complex pointer arithmetic operations, virtual-base offsets, virtual function pointer tables, and run-time libraries. The resulting program can then be easily and accurately analyzed by a wide variety of program analysis applications (block 540).

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for transforming a program with a priori given class hierarchy that is induced by inheritance, comprising:
   a processor for executing computer program instructions; and
   an inheritance remover configured to remove inheritance from a given program stored on a computer readable storage medium to produce an analysis-friendly program which does not include virtual-function pointer tables and runtime libraries associated with inheritance-related operations, the analysis-friendly program preserving the semantics of the given program with respect to a given class hierarchy.

2. The system as recited in claim 1, further comprising a clarifier configured to identify implicit expressions and function calls in the given program and transform the given program into at least one intermediate program with explicit expressions and function calls.

3. The system as recited in claim 2, wherein the inheritance remover operates on the at least one intermediate program generated by the clarifier.

4. The system as recited in claim 2, wherein the clarifier introduces a construct into the at least one intermediate program to preserve semantics of base class constructor invocations.

5. The system as recited in claim 2, wherein the clarifier introduces a construct into the at least one intermediate program to preserve the semantics of a ternary operator and operations which include creating temporary objects.

6. The system as recited in claim 1, wherein the inheritance remover comprises an object model builder configured to transform an object with inheritance in the given program to an object without inheritance in the analysis-friendly program.

7. The system as recited in claim 1, further comprising an object model builder configured to create separate, independent instances of each sub-object associated with an object and utilize additional pointer fields to indicate relationships among the object and sub-objects.

8. The system as recited in claim 7, wherein the additional pointer fields are appended to an object or sub-object to identify an immediate base class of the object or sub-object.

9. The system as recited in claim 7, wherein the object model builder is configured to incorporate all fields and members of each sub-object into the object.

10. The system as recited in claim 1, wherein the inheritance remover is further configured to resolve casts, field accesses and member function calls.

11. A method for transforming a program, comprising:
    providing a given program having inheritance, wherein the program is stored on a computer readable storage medium; and
    removing inheritance from the given program to produce an analysis-friendly program which does not include virtual-function pointer tables and runtime libraries associated with inheritance-related operations, the analysis-friendly program preserving the semantics of the given program with respect to a given class hierarchy.

12. The method as recited in claim 11, further comprising identifying implicit expressions and function calls in the given program and transforming the given program into at least one intermediate program with explicit expressions and function calls.

13. The method as recited in claim 11, wherein a construct is introduced into the at least one intermediate program to preserve semantics of base class constructor invocations.

14. The method as recited in claim 11, wherein a construct is introduced into the at least one intermediate program to preserve the semantics of a ternary operator and operations which include creating temporary objects.

15. The method as recited in claim 11, further comprising:
    creating separate, independent instances of each sub-object associated with an object; and
    utilizing additional pointer fields to indicate relationships among the object and sub-objects.

16. The method as recited in claim 15, wherein the additional pointer fields are appended to an object or sub-object to identify an immediate base class of the object or sub-object.

17. The method as recited in claim 15, further comprising incorporating all fields and members of each sub-object into the object.

18. The method as recited in claim 11, further comprising resolving casts, field accesses and member function calls.

19. A system for transforming a program with a priori given class hierarchy that is induced by inheritance, comprising:
    a processor executing an inheritance remover configured to remove inheritance from a given program stored on a computer readable storage medium to produce an analysis-friendly program which does not include virtual-function pointer tables and runtime libraries associated with inheritance-related operations, the analysis-friendly program preserving the semantics of the given program with respect to a given class hierarchy; and
    a clarifier configured to identify implicit expressions and function calls in the given program and transform the given program into at least one intermediate program with explicit expressions and function calls.

* * * * *